United States Patent [19]
Cinger

[11] 3,807,292
[45] Apr. 30, 1974

[54] APPARATUS FOR COOKING FOOD PRODUCTS

[75] Inventor: Jean DePrimus Cinter, Sierre, Switzerland

[73] Assignee: Traitements Thermiques S.A., Sierre, Switzerland

[22] Filed: Dec. 18, 1972

[21] Appl. No.: 316,036

Related U.S. Application Data

[62] Division of Ser. No. 152,736, June 14, 1971, abandoned.

[52] U.S. Cl. ............... 99/348, 99/427, 99/443 R, 259/89

[51] Int. Cl. ............... A47j 27/14

[58] Field of Search ............... 259/3, 14, 30, 57, 81, 259/89, 90; 99/348, 409, 426, 427, 443 R, 371; 432/103; 219/389; 248/130; 34/108; 51/164; 241/178; 308/204

[56] References Cited
UNITED STATES PATENTS

| | | | |
|---|---|---|---|
| 2,939,383 | 6/1960 | Kanaga | 99/348 X |
| 3,458,326 | 7/1969 | Nicolaus et al. | 99/348 X |
| 2,078,829 | 4/1937 | Barratt | 241/178 |

FOREIGN PATENTS OR APPLICATIONS

| | | | |
|---|---|---|---|
| 423,668 | 4/1911 | France | 51/164 |

*Primary Examiner*—Billy J. Wilhite
*Attorney, Agent, or Firm*—Brady, O'Boyle & Gates

[57] ABSTRACT

A hollow drum is supported at the inner periphery of the opposite open ends of the drum by rollers carried by a pair of shafts extending into the drum and parallel with the axis of the drum, wherein at least one of the shafts is rotatable to rotate the drum. A radiant heater extends into the drum through one end thereof and longitudinally of the drum substantially parallel with and in the plane of the pair of shafts. Pieces of material to be fried are wetted with liquid fat or oil, rotated in the drum past the radiant heater until fried on both sides due to tumbling in the drum, and then removed from the drum either by action of the arrangement of ribs on the inner surface of the drum or by removing the drum from the rollers and emptying it.

8 Claims, 4 Drawing Figures

PATENTED APR 30 1974  3,807,292
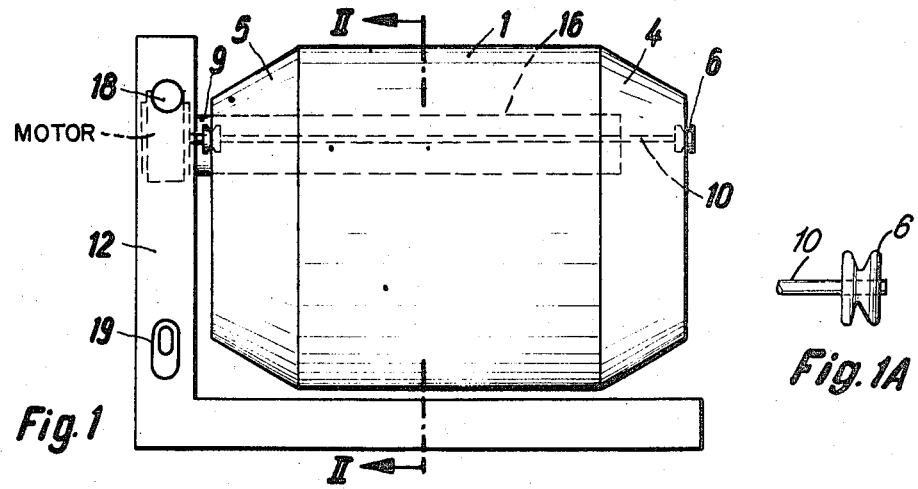
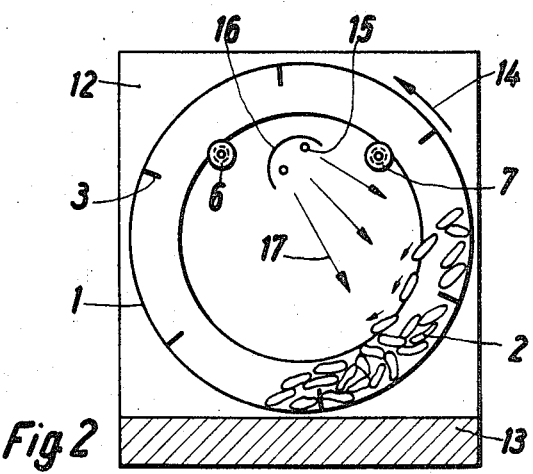
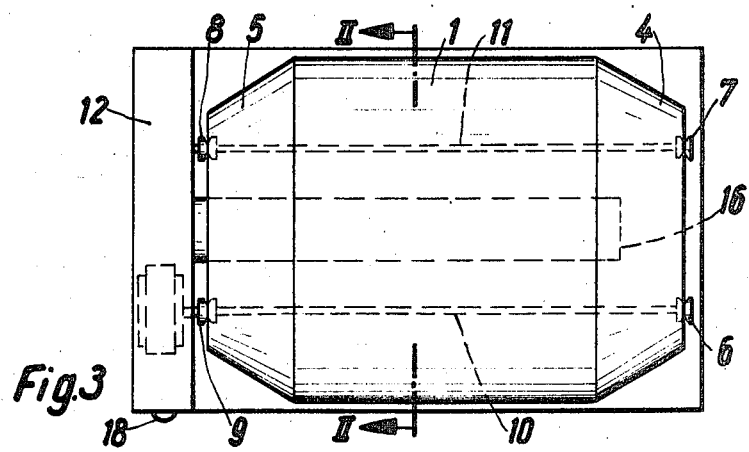
Inventor:
Jean de Primus Cinter
BY Brady, O'Boyle & Gates
ATTORNEYS

APPARATUS FOR COOKING FOOD PRODUCTS

This is a division, of application Ser. No. 152,736, filed June 14, 1971 now abandoned.

This invention relates to apparatus for cooking food products and more particularly to a frying device.

It is known that in making "chip potatoes" for instance, raw potatoes are cut into lengths and the lengths are cooked as they float in liquid fat. The usual fryers consist of an electrically heatable vat of fat, whose temperature can be kept constant by a thermostat, with a wire-basket for conaining the lengths of potato and which can be immersed in the vat of fat. The known method of frying and the known fryers require a relatively large amount of liquid fat, e.g., oil, even when making a small quantity of fried material, e.g., "chip potatoes."

It is an object of the present invention to avoid or mitigate this disadvantage, and to improve the health value of the fried food.

In accordance with the frying device provided by the invention, this is achieved in that the pieces of material to be fried are wetted with liquid fat, in particular with oil, and are then heated by radiant heat.

The device has a drum, connected to a rotary drive, for holding the material wetted with liquid fat, and a heat radiator disposed in the drum.

There will now be described one embodiment of the frying device according to the invention, by reference to the accompanying drawings, in which:

FIG. 1 shows a front view of the fryer;

FIG. 1A is an enlarged side elevation view of one of the drum support rollers;

FIG. 2 shows a section on the line II—II in FIGS. 1 and 3; and

FIG. 3 shows a plan view of the fryer of FIG. 1.

The fryer shown has a rotatably mounted horizontal drum 1 for pieces of material 2 (FIG. 2) which are wetted with liquid fat and which are to be heated by radiant heat. The drum 1 has inwardly projecting ribs 3 extending parallel to the drum axis, and conically tapered ends 4 and 5. At the inner edge of its end faces, the drum 1 is mounted on two rollers 6, 7 and 8, 9 each of which has a grooved periphery (FIG. 1A) of V-shaped cross-section in which the edge of the end face of the drum 1 runs. The rollers 6 and 9 are mounted on a shaft 10, and rollers 7 and 8 are affixed to a shaft 11. In the side portion 12 of a frame whose base portion is indicated by reference numeral 13, the shaft 10 is affixed in a cantilevered manner and the shaft 11 is rotatably cantilever mounted. The latter is coupled to an electric motor schematically illustrated in dotted lines in FIG. 1 and 3, whereby the drum 1 can be driven in the direction of the arrow 14. In the drum 1 are provided two electrical heating bars 15, above the drum axis and parallel thereto. The heating bars 15 have a reflector 16. The heating bars 15 and the reflector 16 are disposed so that the heat radiation indicated by arrows 17 is directed on to a lower section of the drum wall which is rising as the drum 1 rotates. The reflector 16 is disposed so that it covers over the top of the two heating bars 15. The heating bars 15 and the reflector 16 are affixed to the side portion 12. Reference numeral 18 indicates a switch for the drive motor and the heating bars 15, while reference numeral 19 indicates a signal light.

In order to shake the fried material out of the drum 1, or to permit easy cleaning of the drum, the drum can be lifted from the rollers 6 – 9, and removed to the right from the frame 12, 13 and the outer free ends of shafts 10 and 11, as seen in FIGS. 1 and 3.

The drum 1 may be perforated.

For frying, the pieces of material 2 wetted, e.g., with oil, are filled into the drum 1. The drum drive and the heating bars 15 are then switched on. When the drum rotates, the ribs 3 entrain the material 2 and let the pieces drop above the horizontal diametral plane of drum 1. Because of the random nature of their movements, the entrained and the falling pieces are in practice heated on all sides by the heat radiation 17, and so fried. When the fried material has reached the required condition, the rotary drive and the heating bars are switched off, the drum is removed from the frame and the material shaken out, whereupon a fresh frying may follow.

In the case of pieces which stick to the drum wall and then come away from the wall and drop while above the heat radiator 15, 16 the reflector 16 forms a guide wall which deflects these pieces past the heating bars 15.

Frying with device of the invention can also be performed continuously, with the pieces of material wetted with liquid fat fed in at one end of a rotary horizontal drum containing a heat radiator and removed at the other end. In order to feed the material through the drum in that case, the ribs are not parallel to the drum axis, but are helically disposed.

I claim:

1. Apparatus for cooking food products comprising, a frame, shaft means cantilever mounted at one end on said frame and having an outer free end, rollers mounted on each end of said shaft means, a drum for containing food products to be cooked supported by said rollers, drive means operatively connected to said shaft means for rotating said drum, a source of heat positioned in said drum for cooking the food products being tumbled in the rotating drum, and said shaft means extending within and longitudinally of said drum with the drum being freely removable from such rollers and the outer free end of said shaft means.

2. Apparatus for cooking food products according to claim 1 wherein the longitudinal axis of the drum is horizontally disposed, the shaft means being disposed above and parallel to the longitudinal axis of the drum whereby the drum is suspended from the shaft means.

3. Apparatus for cooking food products according to claim 2 wherein the source of heat comprises a radiant heater extending into the drum through one end thereof and substantially parallel to the shaft means, said source of heat including a reflector for directing radiated heat toward the lower portion of the drum wall, said reflector also functioning as a guide wall whereby products temporarily adhering to the drum wall will be deflected past the heat source as the products drop from the drum wall.

4. Apparatus for cooking food products according to claim 1 wherein the drum is provided with inwardly projecting ribs for entraining the products placed in the drum in an arcuately rising path during rotation of the drum and allowing the products to drop, whereby the products are tumbled while being cooked.

5. Apparatus for cooking food products according to claim 4 wherein the drum is provided with an opening at each end thereof, the drum being conically tapered at each end to prevent the products from falling out of the drum during the rotation thereof.

6. Apparatus for cooking food products comprising, a frame, a pair of spaced parallel shafts mounted on said frame, rollers mounted on each end portion of said pair of shafts, a drum for containing food products to be cooked supported by said rollers, said pair of shafts extending within and longitudinally of the drum, drive means operatively connected to at least one of the shafts of said pair of shafts for rotating said drum, and a source of heat positioned in said drum for cooking the food products being tumbled in the rotating drum.

7. Apparatus for cooking food products comprising, a frame, shaft means mounted on said frame, rollers mounted on each end portion of said shaft means, a drum having an opening at each end thereof and adaped to contain food products to be cooked supported by said rollers, said shaft means extending within and longitudinally of the drum, drive means operatively connected to said shaft means for rotating said drum, a source of heat positioned in said drum for cooking the food products being tumbled in the rotating drum, and said rollers engaging the drum along the peripheral edge of the opening at each end of the drum, whereby the drum is removably mounted on the rollers.

8. Apparatus for cooking food products according to claim 7, wherein the periphery of each roller is formed with a groove to facilitate engagement of the roller with the peripheral edge of the drum opening.

* * * * *